Figure 1:
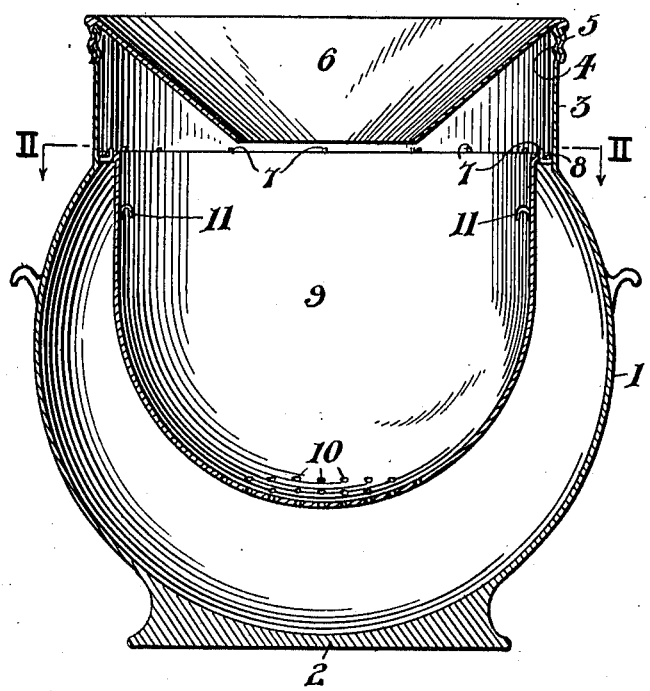

H. G. SCHOLL.
CUSPIDOR.
APPLICATION FILED DEC. 26, 1911.

1,021,073. Patented Mar. 26, 1912.

WITNESSES

INVENTOR
Henry G. Scholl
BY
ATTORNEYS

UNITED STATES PATENT OFFICE.

HENRY G. SCHOLL, OF HOBOKEN, PENNSYLVANIA.

CUSPIDOR.

1,021,073.  Specification of Letters Patent.  Patented Mar. 26, 1912.

Application filed December 26, 1911. Serial No. 667,752.

*To all whom it may concern:*

Be it known that I, HENRY G. SCHOLL, citizen of the United States of America, residing at Hoboken, in the county of Allegheny and State of Pennsylvania, have invented certain new and useful Improvements in Cuspidors, of which the following is a specification, reference being had therein to the accompanying drawing.

This invention relates to cuspidors, and the objects of my invention are to furnish a cuspidor with a novel strainer that will prevent cigars, cigarettes and other solid matter from co-mingling with the liquid within the cuspidor, and to provide a cuspidor that can be easily and quickly cleaned and maintained in a sanitary condition.

Further objects of my invention are to provide a cuspidor with novel means for preventing the contents thereof from being spilled when the cuspidor is accidentally tilted or upset, and to accomplish the above results by a cuspidor that is simple in construction, inexpensive to manufacture and susceptible to any desired ornamentation.

With the above and other objects in view, the invention resides in the novel construction and arrangement of parts to be hereinafter specifically described and then claimed.

Reference will now be had to the drawing, wherein—

Figure 2:
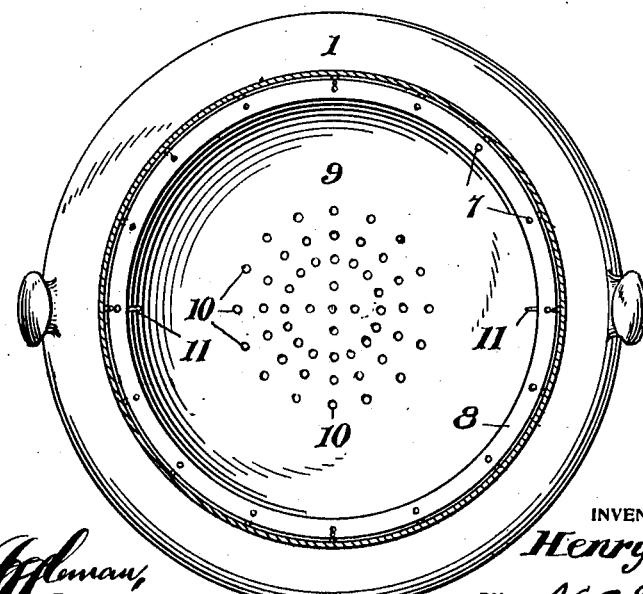

Figure 1 is a vertical sectional view of a cuspidor in accordance with this invention, and Fig. 2 is a horizontal sectional view of the same taken on the line II—II of Fig. 1.

A cuspidor in accordance with this invention comprises a spherical receptacle 1 having a flat bottom or pedestal 2 and a cylindrical neck 3. The upper edges of the neck 3 are screw-threaded, as at 4, to receive the depending screw-threaded flange 5 of a funnel-shaped mouthpiece 6 that extends into the neck 3. The neck 3, at the lower edge thereof, is provided with a plurality of circumferentially arranged and inwardly projecting hooks 7, and these hooks are adapted to support the apertured flange 8 of an inner receptacle or cup-shaped strainer 9, said inner receptacle having the bottom thereof perforated or provided with openings 10. The inner receptacle, adjacent to the upper end thereof, is provided with diametrically opposed and inwardly projecting handles 11 to facilitate the moving of the inner receptacle from the outer receptacle 1, after the funnel-shaped mouthpiece 6 is detached.

Should the cuspidor be tilted, the liquid matter within the receptacle 1 cannot splash from the cuspidor by reason of the inner receptacle 9 and the funnel-shaped mouthpiece 6, said funnel-shaped mouthpiece preventing the solid matter within the inner receptacle from being thrown from the cuspidor.

Should the cuspidor be completely upset, the inner receptacle or strainer 9 may become detached from the hook 7, but the funnel-shaped mouthpiece 6 holds the inner receptacle or strainer 9, while the solid matter within said inner receptacle is retained within the cuspidor by the funnel-shaped mouthpiece 6. The liquid within the outer receptacle 1 cannot be spilled by reason of the inner receptacle 9 riding into engagement with the funnel-shaped mouthpiece 6, the space around the inner receptacle 9 accommodating the liquid within the receptacle 1.

It is obvious that the funnel-shaped mouthpiece 6 can be easily removed, and the inner receptacle or strainer 9 taken from the outer receptacle 1. When these parts are disassembled, they can be easily and quickly cleaned and the cuspidor maintained in a sanitary condition.

The cuspidor in its entirety is made of light and durable metal and the invention is not limited to the size, shape, or ornamentation to which the cuspidor is susceptible.

What I claim is:

A cuspidor comprising an outer spherical receptacle having a flat bottom, a cylindrical neck carried by the top of said receptacle and having the upper edges thereof screw-threaded, a funnel-shaped mouthpiece screwed upon the upper edges of said neck and extending therein, a plurality of circumferentially arranged and inwardly projecting hooks carried by the lower edges of said neck, an inner receptacle suspended upon said hooks, said receptacle having the bottom thereof perforated, and oppositely disposed inwardly projecting handles carried by said inner receptacle to facilitate its removal from said outer receptacle.

In testimony whereof I affix my signature in the presence of two witnesses.

HENRY G. SCHOLL.

Witnesses:
CHRISTINA T. HOOD,
MAX W. SROLOVITZ.